United States Patent
Juestel et al.

(10) Patent No.: US 8,907,292 B2
(45) Date of Patent: Dec. 9, 2014

(54) TUNGSTATE-BASED SCINTILLATING MATERIALS FOR DETECTING RADIATION

(75) Inventors: Thomas Juestel, Witten (DE); Cornelis Reinder Ronda, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 924 days.

(21) Appl. No.: 12/970,399

(22) Filed: Dec. 16, 2010

(65) Prior Publication Data

US 2011/0147595 A1 Jun. 23, 2011

Related U.S. Application Data

(60) Provisional application No. 61/288,874, filed on Dec. 22, 2009.

(51) Int. Cl.
*G01T 1/20* (2006.01)
*C09K 11/06* (2006.01)
*C09K 11/68* (2006.01)
*C09K 11/77* (2006.01)
*C01G 41/02* (2006.01)
*C01G 41/00* (2006.01)
*G01T 1/202* (2006.01)

(52) U.S. Cl.
CPC .............. *C01G 41/02* (2013.01); *C01G 41/00* (2013.01); *C01G 41/006* (2013.01); *C09K 11/681* (2013.01); *C09K 11/7708* (2013.01); *C09K 11/7776* (2013.01); *G01T 1/202* (2013.01); *C01P 2002/72* (2013.01); *C01P 2006/60* (2013.01)

USPC .................. 250/370.11; 250/361 R; 250/362; 252/301.17; 252/301.5; 252/301.4 R (58) Field of Classification Search
USPC ............ 250/370.11, 361 R, 362; 252/301.17, 252/301.5, 301.4 R
See application file for complete search history.

(56) References Cited

U.S. PATENT DOCUMENTS

| | | | | |
|---|---|---|---|---|
| 2,257,699 | A | * | 9/1941 | McKeag et al. ............... 252/646 |
| 4,421,671 | A | * | 12/1983 | Cusano et al. ........... 252/301.4 F |
| 5,057,692 | A | * | 10/1991 | Greskovich et al. ...... 250/361 R |
| 5,273,732 | A | | 12/1993 | Srivastava et al. |
| 6,391,434 | B1 | | 5/2002 | Duclos |
| 6,585,913 | B2 | | 7/2003 | Lyons et al. |
| 7,547,888 | B2 | | 6/2009 | Cooke et al. |
| 7,608,829 | B2 | | 10/2009 | Loureiro et al. |
| 7,667,179 | B2 | * | 2/2010 | Ogawa et al. .............. 250/208.1 |
| 2008/0093557 | A1 | | 4/2008 | Cooke et al. |

FOREIGN PATENT DOCUMENTS

EP  0128659 A1 * 12/1984
EP  1291676      3/2003

OTHER PUBLICATIONS

Zhang et al., "Structure refinement of Lu2WO6 and luminescent properties of Eu3+, Pr3+ doped Lu2WO6," Journal of Alloys and Compounds, vol. 466, Oct. 20, 2008, pp. 258-263. DOI: 10.1016/j.jallcom.2007.11.050.*

(Continued)

*Primary Examiner* — David Porta
*Assistant Examiner* — Mindy Vu (57) ABSTRACT

A tungstate-based scintillating material and a method for using a tungstate-based scintillating material is provided. In addition, a radiation detector and an imaging device incorporating a tungstate-based scintillating material are provided.

28 Claims, 8 Drawing Sheets

(56) References Cited

OTHER PUBLICATIONS

Lei et al., " Solid-state synthesis, characterization and luminescent properties of Eu3+-doped gadolinium tungstate and molybdate phosphors: Gd (2-x)MO6:Eux3+ (M=W, Mo)," Journal of Solid State Chemistry, vol. 181, Jul. 16, 2008, pp. 2845-2851. DOI: 10.1016/j.jssc.2008.07.008.*

Zhang, ZJ et al., Structure Refinement of Lu2WO6 and Luminescent Properties of Eu3+, Pr3+ Doped Lu2WO6, Journal of Alloys and Compounds, Oct. 20, 2008, 466 (1-2), Abstract, Elsevier Science SA, Lausanne, Switzerland.

Van Eijk, C.W.E. et al., Nd3+ and Pr3+ Doped Inorganic Scintillators, IEEE Transactions on Nuclear Science, Aug. 1994, 738-741, vol. 41, No. 4.

Lei, F. et al., Solid-State Synthesis, Characterization and Luminescent Properties of Eu3+-Doped Gadolinium Tungstate and Molybdate Phosphors: Gd (2-x) MO6:Eux3+ (M=W, Mo), Journal of Solid State Chemistry, 2008, 181 (10), Abstract.

* cited by examiner

TUNGSTATE-BASED SCINTILLATING MATERIALS FOR DETECTING RADIATION

CROSS REFERENCE TO RELATED APPLICATIONS

This application claims the benefit of U.S. provisional application Ser. No. 61/288,874 filed Dec. 22, 2009, which is incorporated herein by reference.

DESCRIPTION

The present application relates generally to the imaging arts and more particularly to a tungstate-based scintillating material for use in detecting radiation. The application subject matter finds particular use with x-ray based imaging systems, especially computed tomography (CT) imaging systems, and will be described with particular reference thereto. However, it could also be used in connection with other imaging systems or related systems or components, such as single-photon emission computed tomography (SPECT) or positron emission tomography (PET) imaging systems, as well as x-ray intensifying screens.

Computed tomography (CT) imaging systems typically employ an x-ray source that generates x-rays that traverse an examination region. A subject arranged in the examination region interacts with and absorbs a portion of the traversing x-rays. A radiation detector is arranged opposite the x-ray source to detect and measure intensities of the transmitted x-rays. The radiation detector typically includes several pixels, with each pixel including one or more blocks of scintillating material optically coupled to a photodetector. The scintillating material produces bursts of light, called scintillation events, in response to x-rays. The photodetector, such as a photomultiplier or photodiode, produces electrical signals indicative of the intensity of the scintillation events.

The performance of a scintillating material depends on many properties of the material, including for example its stopping power, density, brightness, rise time, decay time or afterglow, and spectral match with the downstream photodetector. A scintillating material's stopping power indicates how well the material will "stop" and therefore scintillate in response to an x-ray impinging on the scintillating material. A higher stopping power is generally desirable in a scintillating material over a lower stopping power, because it increases the efficiency of the scintillation and thus reduces the amount of x-ray dosage required. Similarly, a higher density is generally desirable in a scintillating material over a lower density, because it permits less material to be used to generate a given stopping power, thus reducing cost.

The brightness of a scintillating material indicates how much light it produces in response to the incoming x-ray radiation or other radiation to be detected. Generally, a more bright scintillator is preferred to a less bright scintillator.

A scintillating material's rise time is the amount of time it takes for the scintillating material to scintillate in response to incoming radiation. Its decay time or afterglow is the persistence of excited light beyond the main emission. Generally speaking, it is desirable to reduce a scintillator's rise time and decay time. That is, a rise time or decay time which is shorter in time is preferred to a rise time or decay time which is longer in time. Shorter times generally increase the precision of the radiation detection, and also reduce the time required to make a scan of a patient or object to be imaged.

Many suitable scintillating materials have been found and used. Widely used scintillators include $Ce^{3+}$, $Pr^{3+}$ or $Nd^{3+}$ doped inorganic host lattices, such as $Lu_2SiO_5$, $LuPO_4$, and $Lu_2Si_2O_7$, whereby the high density of the host lattice provides an optimal stopping power. There is, however, an ongoing need to find and develop new scintillating materials which efficiently convert x-rays or other radiation into visible light or ultraviolet light for further electronic processing by a photodiode, photomultiplier, or the like. Such new scintillating materials are of high interest particularly if their density or light yield is high or if their rise and decay times are short.

Manufacturing a suitable scintillator for commercial use in a radiation detector is a complicated and expensive process. The process begins with gathering or synthesizing the requisite raw materials. The raw materials are typically processed to remove impurities. After the raw materials are gathered and purified to the extent practicable, they are then combined to form a scintillator. Crystalline scintillators are often formed by melting the raw materials together in a molten pool of material, which is then crystallized. Ceramic scintillators are often formed by pressing techniques and high temperature heat treatments, without melting the scintillator material. A scintillator may also be a composite material, comprising a mixture of a scintillating powder dispersed within a host medium such as a resin, wherein the scintillating powder and the host medium have a similar index of refraction.

According to one aspect of the present invention, a tungstate-based scintillating material is provided. In particular, tungstate-based scintillating materials according to the formulas $Cs(Lu_{1-x}Y_x)W_2O_8$ where $0 \leq x \leq 1$, $Gd_2WO_6$, $La_2W_2O_9$, and $CsTaWO_6$, have been found to be useful scintillating materials. They have a sufficiently high density to provide adequate stopping power, and they exhibit efficient x-ray luminescence in the red to near infrared range. In some embodiments such tungstate-based scintillating materials may be doped or activated, such as with $Pr^{3+}$ or $Nd^{3+}$, to improve the scintillation properties of the scintillating material.

According to another aspect of the present invention, a method of using a tungstate-based scintillating material is provided. Such tungstate-based scintillating materials are used as a luminescent powder layer for an x-ray intensifying screen or as a ceramic or single crystalline converter for a computer tomography imaging scanner. In yet additional aspects of the present invention, a radiation detector and imaging device incorporating a tungstate-based scintillating material are provided.

Numerous additional advantages and benefits will become apparent to those of ordinary skill in the art upon reading the following detailed description of the preferred embodiments. The invention may take form in various chemical compositions, various components and arrangements of components, and in various process operations and arrangements of process operations. The drawings are only for the purpose of illustrating preferred embodiments and are not to be construed as limiting the invention.

CT Imaging Systems

The medical imaging system and apparatus of the present application is generally any medical imaging system, for example, a CT, SPECT or PET imaging system. More specifically, with reference to FIG. 1, in an exemplary embodiment, the medical imaging system 100 is a CT imaging system. The CT imaging system 100 includes a subject support 110, such as a table or couch, which supports and positions a subject being examined and/or imaged, such as a patient. The CT imaging system 100 includes a stationary gantry 120 with a rotating gantry 130 mounted inside. An imaging bore or other suitable imaging area 140 extends through the stationary gantry 120. The imaging bore 140 defines an examination region. The subject support 110 is linearly movable along a Z-axis relative to the imaging bore 140, thus allowing the subject support 110 and the imaged subject when placed thereon to be moved within and removed from the imaging bore 140.

Figure 1:
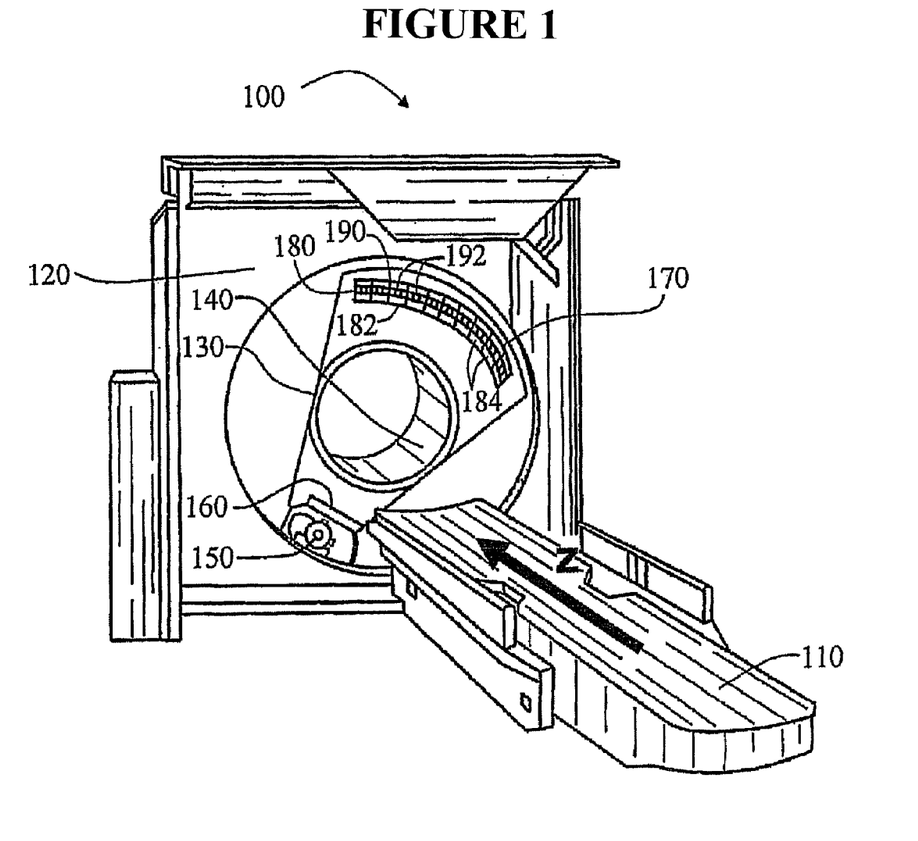
FIG. 1 is an exemplary CT imaging system, with a portion of the stationary gantry cut away to reveal the rotating gantry, x-ray source and radiation detector.

The rotating gantry 130 is adapted to rotate around the imaging bore 140 (i.e., around the Z-axis) and the imaged subject when located therein. One or more x-ray sources 150 with collimator(s) 160 are mounted on the rotating gantry 130 to produce an x-ray beam directed through the imaging bore 140 and the imaged subject when located therein.

One or more radiation detector units 170 are also mounted on the rotating gantry 130. Typically, the x-ray source(s) 150 and the radiation detector unit(s) 170 are mounted on opposite sides of the rotating gantry 130 from one another and the rotating gantry 130 is rotated to obtain an angular range of projection views of the imaged subject. The radiation detector unit(s) 170 include a scintillating material 180. The scintillating material 180 may be, for example, a ceramic scintillating material. In some embodiments, the scintillating material 180 is made up of an array of individual crystals that are assembled together or cut from a common scintillator plate by photoetching or some other technique.

The CT imaging system 100 may include a grid 182, such as an anti-scatter grid, which is arranged on a radiation receiving face of the scintillating material 180. An array 190 of photodetectors 192, such as photomultipliers or photodiodes, is provided on the opposite side of the scintillating material 180 from the grid 182. Each of the photodetectors 192 is independently responsive to the scintillation events that occur in the corresponding section 184 of the scintillating material 180.

A computer (not shown) controls the operation of the CT imaging system 100, including the operation of the subject support 110 and rotating gantry 130. The data acquired by the detector unit(s) 170 is reconstructed to form an image that can optionally be displayed on the computer, using conventional methods.

Figure 2:
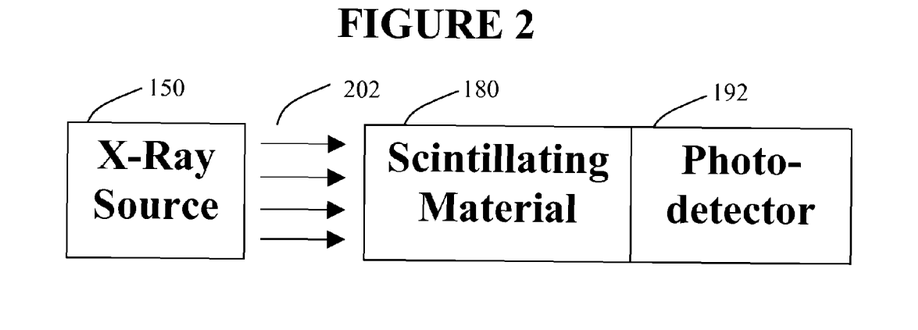
FIG. 2 is a close up view of a portion of the scintillating material and one photodetector of the CT imaging system of FIG. 1.

Referring now to FIG. 2, a schematic view of an x-ray source 150 producing x-ray radiation 202 to be detected by a scintillating material 180 optically coupled to a downstream photodetector 192 is shown. The scintillating material 180 may be a tungstate-based scintillating material, as discussed further below.

The tungstate-based scintillating materials described here may also be used as part of an x-ray intensifying screen.

Tungstate-Based Scintillating Materials

The present invention concerns tungstate-based scintillating materials, such as materials incorporating a host lattice structure according to the following formulas, where $0 \leq x \leq 1$:

| Host Lattice Formula | Crystal System | Density [g/cm³] |
|---|---|---|
| $Bi_2WO_6$ | orthorhombic | 9.51 |
| $LaWO_{0.6}N_{2.4}$ | tetragonal | 9.5 |
| $Er_2WO_6$ | monoclinic | 9.24 |
| $Bi_{0.875}W_{0.125}O_{1.688}$ | tetragonal | 8.79 |
| $Gd_2WO_6$ | monoclinic | 8.36 |
| $Ba_2Lu_{0.667}WO_6$ | trigonal | 7.95 |
| $CrWO_4$ | monoclinic | 7.95 |
| $Na_{0.24}Gd_{0.59}Yb_{0.17}(WO_4)_{0.98}$ | tetragonal | 7.95 |
| $Gd_{0.29}O_3Ta_{0.87}W_{0.13}$ | orthorhombic | 7.9 |
| $AlWO_4$ | monoclinic | 7.77 |
| $Cs(Lu_{1-x}Y_x)W_2O_8$ | monoclinic | 7.7 |
| $La_2W_2O_9$ | triclinic | 7.54 |
| $Ba_{0.21}WO_3$ | hexagonal | 7.46 |
| $LiGaW_2O_8$ | monoclinic | 7.4 |
| $BaSr_5Lu_{1.6}Ho_{0.4}W_3O_{18}$ | trigonal | 7.33 |
| $GdKW_2O_8$ | monoclinic | 7.25 |
| $Ca_{4.26}W_{10}O_{30}$ | tetragonal | 7.16 |
| $CsTaWO_6$ | cubic | 7.09 |
| $La_3BWO_9$ | hexagonal | 6.76 |
| $Ba_3W_2O_{6.27}N_{1.73}$ | trigonal/rhombohedral | 6.71 |
| $Ba_2CaWO_6$ | cubic | 6.69 |
| $Ca_2AsYW_2O_{12}$ | tetragonal | 5.97 |
| $Al_2W_3O_{12}$ | orthorhombic | 5.08 |
| $Lu_2WO_6$ | monoclinic | |

In particularly preferred embodiments, the tungstate-based scintillating materials incorporate a host lattice according to one of the following four formulas: $Gd_2WO_6$, $Cs(Lu_{1-x}Y_x)W_2O_8$, $La_2W_2O_9$, and $CsTaWO_6$. These four host lattices have a high density, a short decay time, and an emission spectrum which nicely overlaps with the spectral sensitivity curve of silicon-based photodiodes. This results in several advantages, including a low manufacturing cost due to a decrease in the amount of material required for a given stopping power, a high resolution, and a short imaging scan time.

Other tungstate-based scintillating materials, such as materials incorporating one of the other host lattices identified in the table above, may also be suitable for these or other reasons in a particular imaging application. The tungstate-based scintillating materials identified in the table above, in particular, have properties that are similar to the four particularly preferred embodiments such that if they were tested in a similar manner they could likely provide similar test results.

The tungstate-based scintillating materials of the present invention may be doped with an activator or a doping agent. Some specific, non-limiting examples of doping agents that can be used are praseodymium (Pr) and neodymium (Nd). Certain exemplary embodiments of the tungstate-based scintillating materials of the present invention may be doped with both praseodymium and neodymium. For example, the tungstate-based scintillating materials may be doped in concentrations between about 0.01% and about 20% of $Nd^{3+}$, $Pr^{3+}$, or a blend thereof. These host lattices show red x-ray luminescence (600-700 nm) if doped by $Pr^{3+}$ and near infrared x-ray luminescence (800-1000 nm) if doped by $Nd^{3+}$. However, different suitable doping agents or no doping agent at all may also be used.

EXAMPLE 1

$Gd_2WO_6$

Samples of $Gd_2WO_6$:$Nd^{3+}$ were prepared in the following manner Materials used as reagents were $Gd_2O_3$ (99.99% pure, obtained from Treibacher), $WO_3$ (99.8% pure, obtained from Alfa Aesar), and as a dopant $Nd_2O_3$ (99.9% pure, obtained from Alfa Aesar). The $Nd_2O_3$ dopant was precalcinated at 1000° C. for 2 hours to achieve dehydration and decarbonation. Stoichiometric amounts of the reagents were ground in an agate mortar for 10 minutes, then transferred to an alumina crucible and annealed from 800 to 1000° C. for 8 hours in air, respectively.

Figure 3:
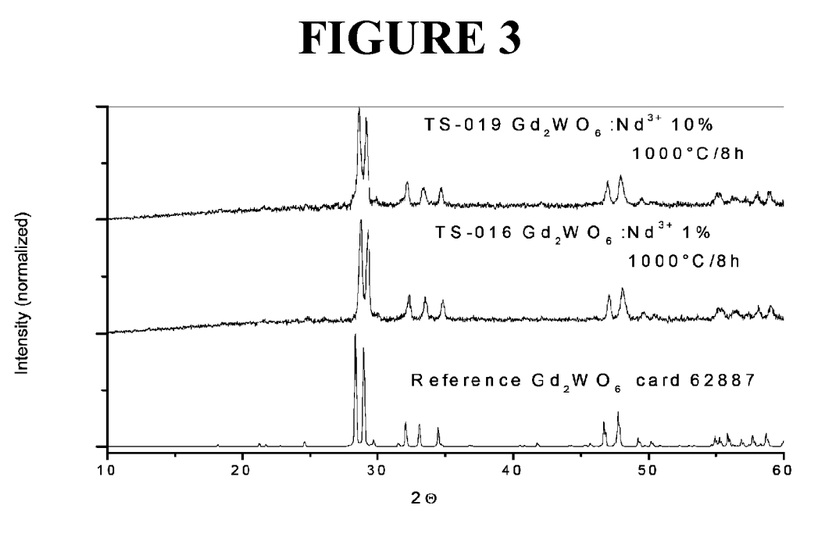
FIG. 3 shows x-ray diffraction patterns of an undoped reference $Gd_2WO_6$ host lattice and two $Gd_2WO_6$ samples respectively doped with 1% and 10% of $Nd^{3+}$.

FIG. 3 shows x-ray diffraction patterns of three different materials. The bottom curve shows the diffraction pattern of the undoped reference $Gd_2WO_6$ host lattice (ICSD No. 62887). The middle curve shows the diffraction pattern of $Gd_2WO_6$:$Nd^{3+}$ synthesized at 1000° C. and doped with 1% of $Nd^{3+}$. The top curve shows the diffraction pattern of $Gd_2WO_6$:$Nd^{3+}$ synthesized at 1000° C. and doped with 10% of $Nd^{3+}$. As can be seen from FIG. 3, the x-ray diffraction patterns confirm the phase purity of the two samples doped with $Nd^{3+}$.

Figure 4A:
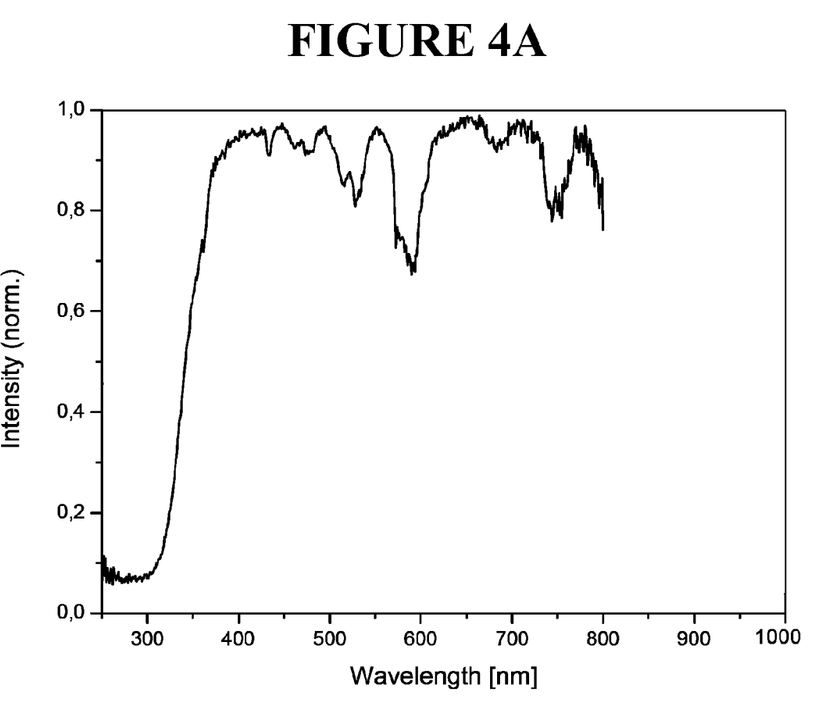
FIGS. 4A through 4C respectively show reflection, excitation and emission spectra of $Gd_2WO_6$ doped with 1% of $Nd^{3+}$ in response to x-ray radiation.
Figure 4B:
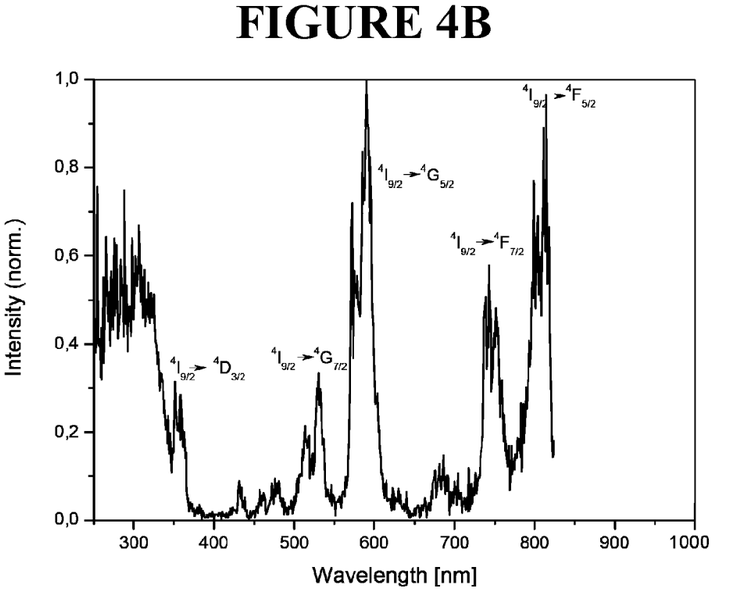
Figure 4C:
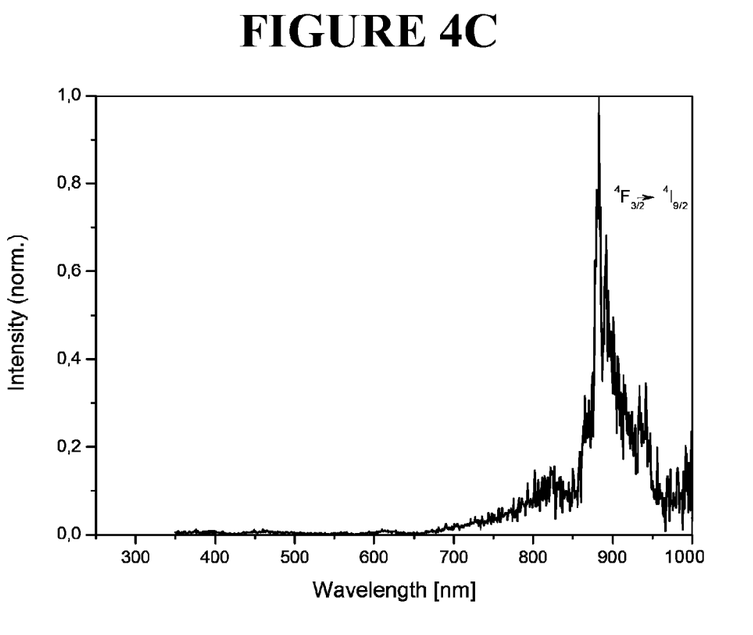

FIGS. 4A through 4C respectively show the reflection, excitation and emission spectra of $Gd_2WO_6$:$Nd^{3+}$ in response to x-ray radiation. These curves establish the suitability of $Gd_2WO_6$:$Nd^{3+}$ doped with 1% of $Nd^{3+}$ as a scintillating material.

EXAMPLE 2

$CsLuW_2O_8$:$Nd^{3+}$

Samples of $CsLuW_2O_8$:$Nd^{3+}$ were prepared in the following manner. Materials used as reagents were $Cs_2CO_3$ (99% pure, obtained from Alfa Aesar), $Lu_2O_3$ (99.99% pure, obtained from Treibacher), $WO_3$ (99.8% pure, obtained from Alfa Aesar), and as a dopant $Nd_2O_3$ (99.9% pure, obtained from Alfa Aesar). The $Nd_2O_3$ dopant was precalcinated at 1000° C. for 2 hours to achieve dehydration and decarbonation. Stoichiometric amounts of the reagents were ground in an agate mortar for 10 minutes, then transferred to an alumina crucible and annealed from 800 to 1000° C. for 8 hours in air, respectively.

Figure 5:
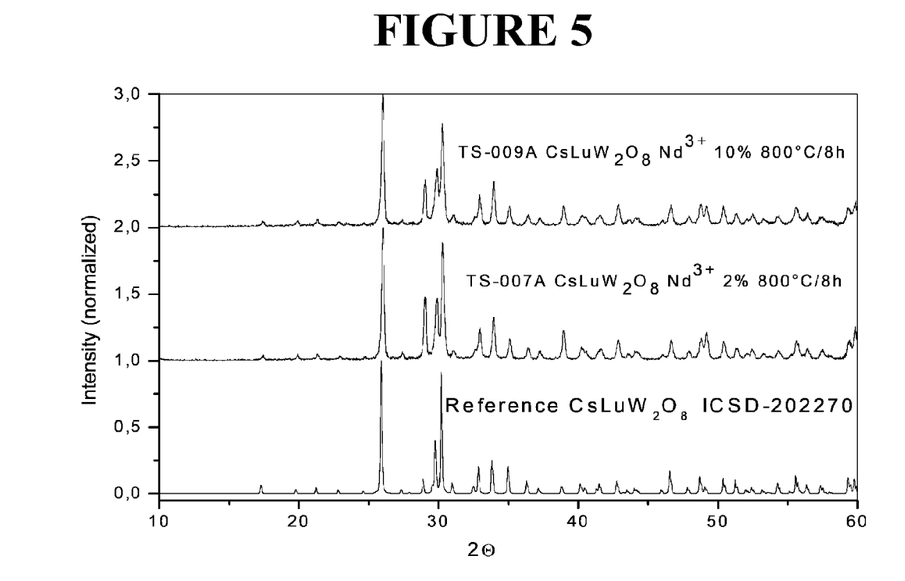
FIG. 5 shows x-ray diffraction patterns of an undoped reference $CsLuW_2O_8$ host lattice and two $CsLuW_2O_8$ samples respectively doped with 2% and 10% of $Nd^{3+}$.

FIG. 5 shows x-ray diffraction patterns of three different materials: The bottom curve shows the diffraction pattern of the undoped reference $CsLuW_2O_8$ host lattice (ICSD No. 202270). The middle curve shows the diffraction pattern of $CsLuW_2O_8$:$Nd^{3+}$ synthesized at 800° C. and doped with 2% of $Nd^{3+}$. The top curve shows the diffraction pattern of $CsLuW_2O_8$:$Nd^{3+}$ synthesized at 800° C. and doped with 10% of $Nd^{3+}$. As can be seen from FIG. 5, the x-ray diffraction patterns confirm the phase purity of the two samples doped with $Nd^{3+}$.

Figure 6A:
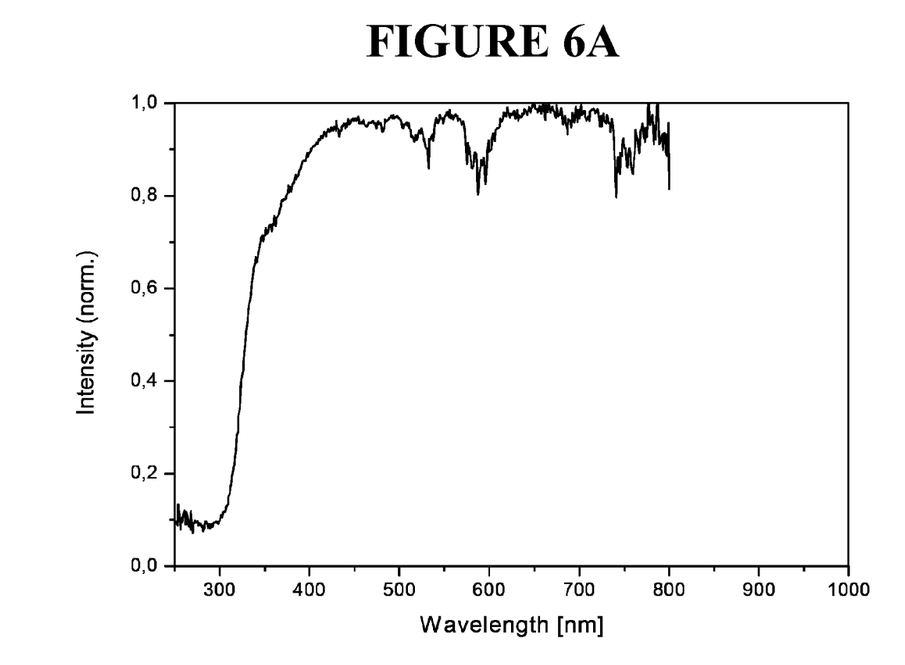
FIGS. 6A through 6C respectively show reflection, excitation and emission spectra of $CsLuW_2O_8$ doped with 2% of $Nd^{3+}$ in response to x-ray radiation.
Figure 6B:
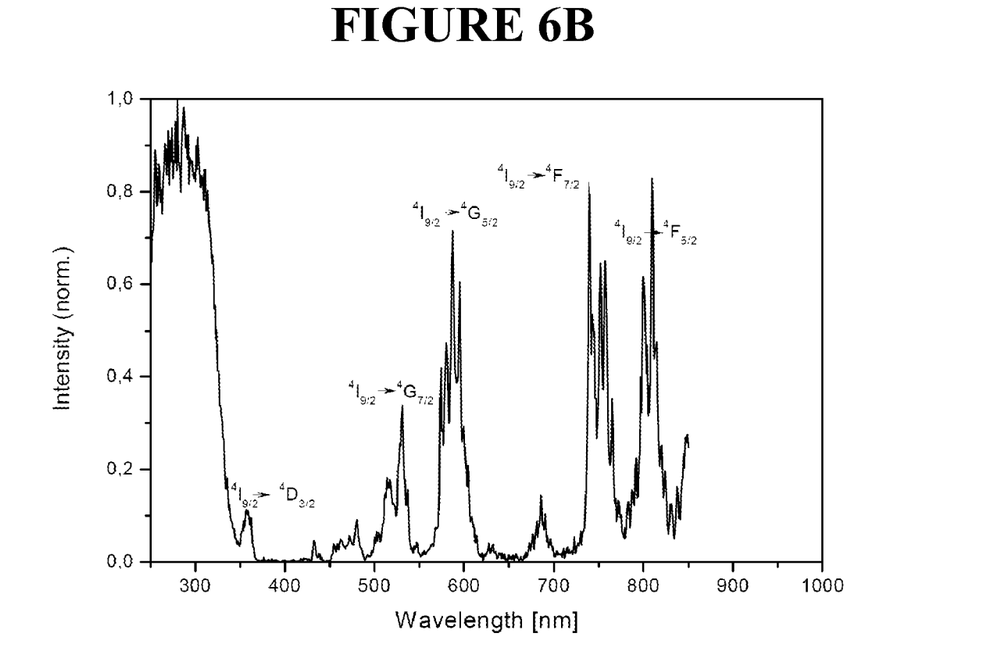
Figure 6C:
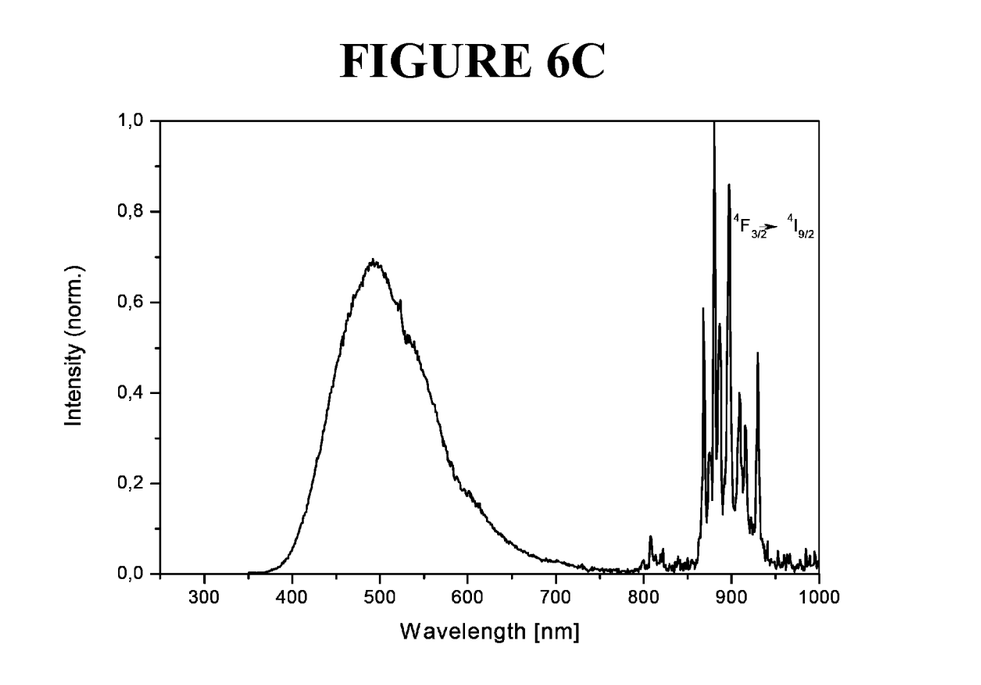

FIGS. 6A through 6C respectively show the reflection, excitation and emission spectra of $CsLuW_2O_8$:$Nd^{3+}$ in response to x-ray radiation. These curves establish the suitability of $CsLuW_2O_8$:$Nd^{3+}$ doped with 2% of $Nd^{3+}$ as a scintillating material.

EXAMPLE 3

$La_2W_2O_9$

Samples of $La_2W_2O_9$:$Nd^{3+}$ were prepared in the following manner. Materials used as reagents were $La_2O_3$ (99.99% pure, obtained from Treibacher), $WO_3$ (99.8% pure, obtained from Alfa Aesar), and as a dopant $Nd_2O_3$ (99.9% pure, obtained from Alfa Aesar). The $Nd_2O_3$ dopant was precalcinated at 1000° C. for 2 hours to achieve dehydration and decarbonation. Stoichiometric amounts of the reagents were ground in an agate mortar for 10 minutes, then transferred to an alumina crucible and annealed from 800 to 1000° C. for 8 hours in air, respectively.

Figure 7:
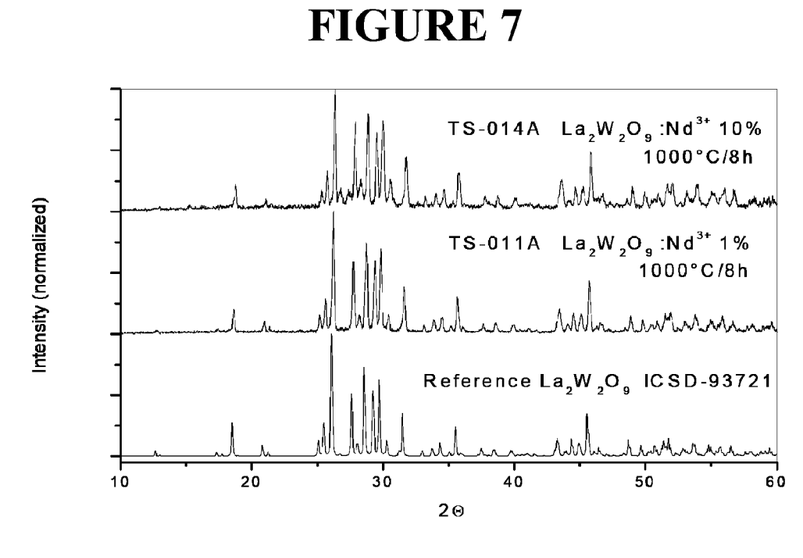
FIG. 7 shows x-ray diffraction patterns of an undoped reference $La_2W_2O_9$ host lattice and two $La_2W_2O_9$ samples respectively doped with 1% and 10% of $Nd^{3+}$.

FIG. 7 shows x-ray diffraction patterns of three different materials: The bottom curve shows the diffraction pattern of the undoped reference $La_2W_2O_9$ host lattice (ICSD No. 93721). The middle curve shows the diffraction pattern of $La_2W_2O_9$:$Nd^{3+}$ synthesized at 1000° C. and doped with 1% of $Nd^{3+}$. The top curve shows the diffraction pattern of $La_2W_2O_9$:$Nd^{3+}$ synthesized at 1000° C. and doped with 10% of $Nd^{3+}$. As can be seen from FIG. 7, the x-ray diffraction patterns confirm the phase purity of the two samples doped with $Nd^{3+}$.

Figure 8A:
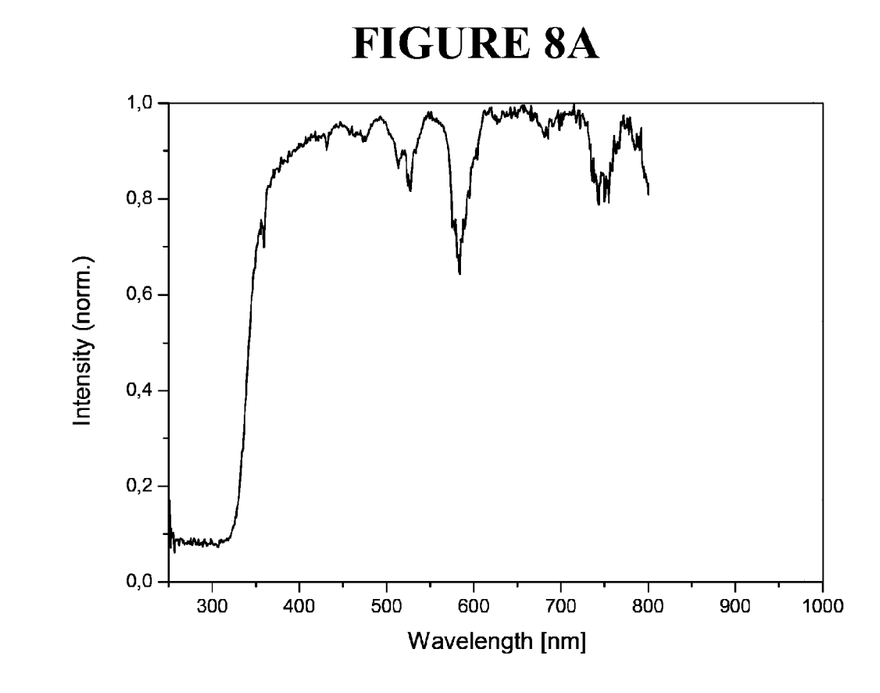
FIGS. 8A through 8C respectively show reflection, excitation and emission spectra of $La_2W_2O_9$ doped with 1% of $Nd^{3+}$ in response to x-ray radiation.
Figure 8B:
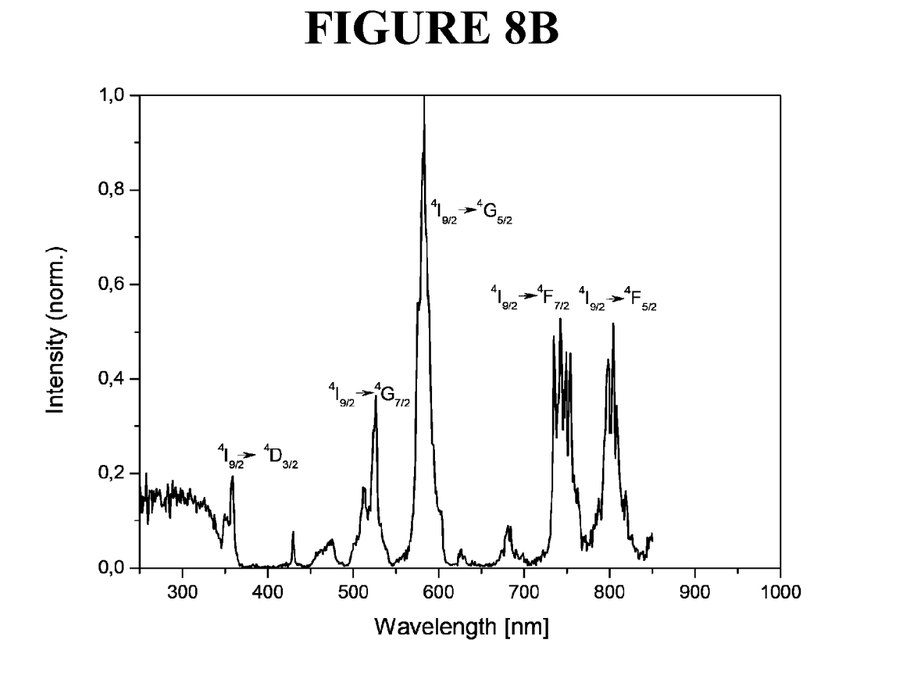
Figure 8C:
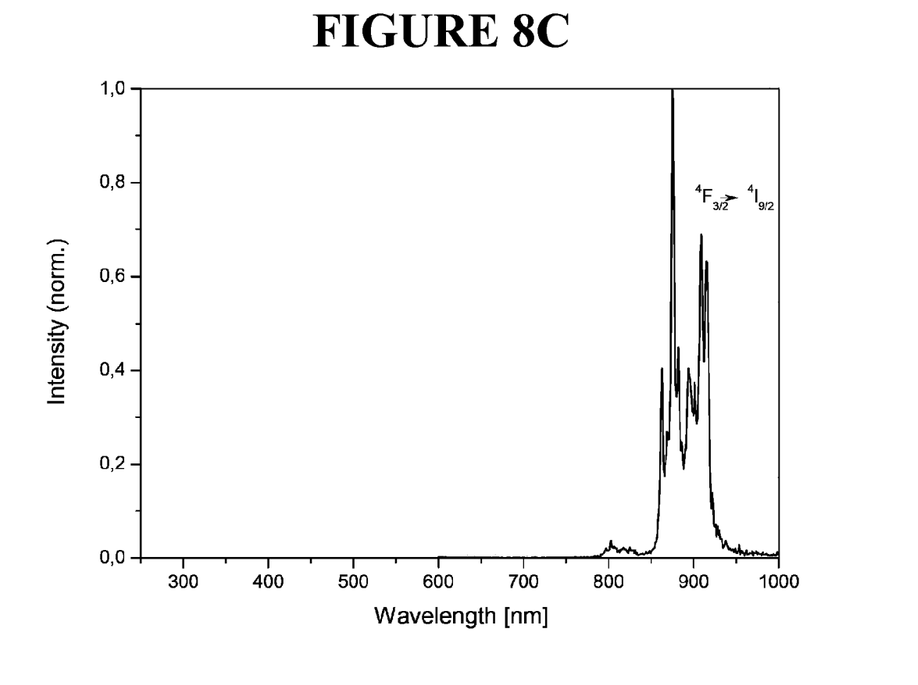

FIGS. 8A through 8C respectively show reflection, excitation and emission spectra of $La_2W_2O_9$:$Nd^{3+}$ in response to x-ray radiation. These curves establish the suitability of $La_2W_2O_9$:$Nd^{3+}$ doped with 1% of $Nd^{3+}$ as a scintillating material.

EXAMPLE 4

$CsTaWO_6$:Nd,Al

Samples of $CsTaWO_6$:$Nd^{3+}$,$Al^{3+}$ were prepared in the following manner. Materials used as reagents were $Cs_2CO_3$ (99% pure, obtained from Alfa Aesar), $Ta_2O_5$ (99.99% pure, obtained from Treibacher), $WO_3$ (99.8% pure, obtained from Alfa Aesar), and as a dopant $Nd_2O_3$ (99.9% pure, obtained from Alfa Aesar). The $Nd_2O_3$ dopant was precalcinated at 1000° C. for 2 hours to achieve dehydration and decarbonation. Stoichiometric amounts of reagents were ground in an agate mortar for 10 minutes, then transferred to an alumina crucible and annealed from 800 to 1000° C. for 8 hours in air, respectively.

Doping of the $CsTaWO_6$ lattice by the $Nd^{3+}$ trivalent ions onto the $Cs^{3\textrm{o}}$ crystal site may require charge compensation. This may be accomplished, for example, by the respective replacement of $Ta^{5+}$ by $Al^{3+}$ in the host lattice.

Figure 9:
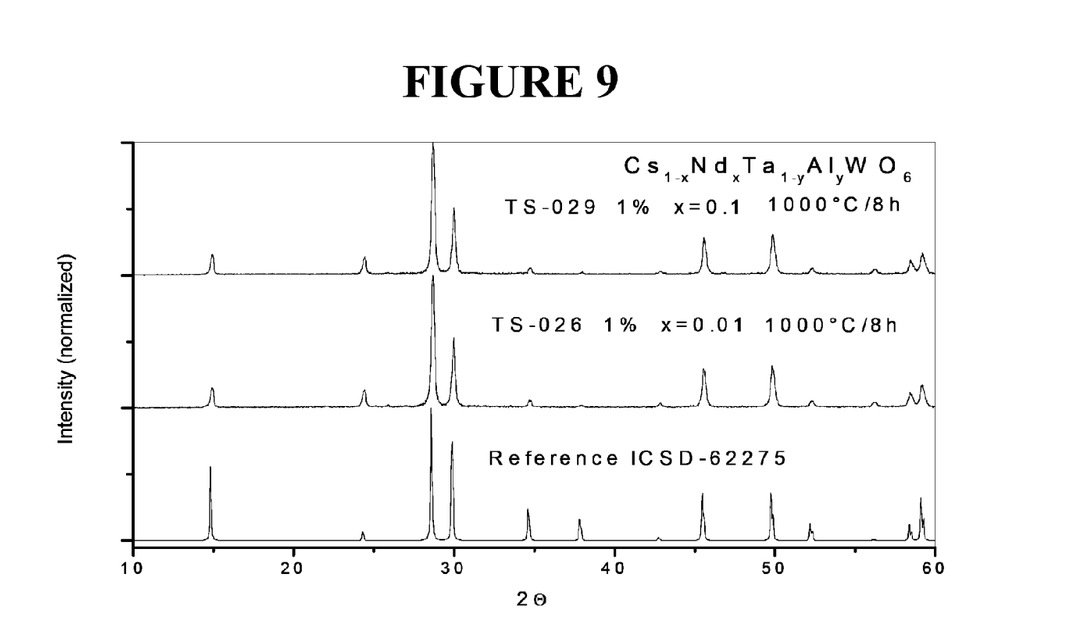
FIG. 9 shows x-ray diffraction patterns of an undoped reference $CsTaWO_6$ host lattice and two $CsTaWO_6$ samples respectively doped with 1% and 10% of $Nd^{3+}$.

FIG. 9 shows x-ray diffraction patterns of three different materials: The bottom curve shows the pattern of the undoped reference $CsTaWO_6$ host lattice (ICSD No. 62275). The middle curve shows the pattern of $CsTaWO_6$:$Nd^{3+}$,$Al^{3+}$ synthesized at 800° C. and doped with 1% of $Nd^{3+}$. The top curve shows the pattern of $CsTaWO_6$:$Nd^{3+}$,$Al^{3+}$ synthesized at 800° C. and doped with 10% of $Nd^{3+}$. As can be seen from FIG. 9, the x-ray diffraction patterns confirm the phase purity of the two samples doped with $Nd^{3+}$. It is believed that these samples, or other samples of $CsTaWO_6$:$Nd^{3+}$,$Al^{3+}$, provide a suitable scintillating material.

Methods of Manufacture and Use

The tungstate-based scintillating materials can be manufactured and used in the same manner as other conventional scintillating materials. Wafer, blank and array production can be performed using the same equipment as used in conventional scintillating material production.

Manufacturing a suitable scintillator for commercial use in a radiation detector is a complicated and expensive process. The process begins with gathering or synthesizing the requisite raw materials. The raw materials are typically processed to remove impurities. After the raw materials are gathered and purified to the extent practicable, they are then combined to form a scintillator. Crystalline scintillators are often formed by melting the raw materials together in a molten pool of material, which is then crystallized. Ceramic scintillators are often formed by pressing techniques and high temperature heat treatments, without melting the scintillator material. A scintillator may also be a composite material, comprising a mixture of a scintillating powder dispersed within a host medium such as a resin, wherein the scintillating powder and the host medium have a similar index of refraction.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various chemical compositions, components and arrangements, combinations and sub-combinations of the elements of the disclosed embodiments.

Having thus described the preferred embodiments, the invention is now claimed to be:

1. A scintillator comprising a tungstate-based material for use with an imaging device, wherein the tungstate-based material is selected from the group consisting of
    $Bi_2WO_6$,
    $LaWO_{0.6}N_{2.4}$,
    $Er_2WO_6$,
    $Bi_{0.875}W_{0.125}O_{1.688}$,
    $Gd_2WO_6$,
    $Ba_2Lu_{0.667}WO_6$,
    $CrWO_4$,
    $Na_{0.24}Gd_{0.59}Yb_{0.17}(WO_4)_{0.98}$,
    $Gd_{0.29O3}Ta_{0.87}W_{0.13}$,
    $AlWO_4$,
    $La_2W_2O_9$,
    $Ba_{0.21}WO_3$,
    $LiGaW_2O_8$,
    $BaSr_5Lu_{1.6}Ho_{0.4}W_3O_{18}$,
    $GdKW_2O_8$,
    $Ca_{4.26}W_{10}O_{30}$,
    $CsTaWO_6$,
    $La_3BWO_9$,
    $Ba_3W_2O_{6.27}N_{1.73}$,
    $Ba_2CaWO_6$,
    $Ca_2AsYW_2O_{12}$, and
    $Al_2W_3O_{12}$.

2. The scintillator of claim 1, wherein the tungstate-based material is selected from the group consisting of
    $Gd_2WO_6$,
    $La_2W_2O_9$, and
    $CsTaWO_6$.

3. The scintillator of claim 1, wherein the tungstate-based material is doped with a doping agent.

4. The scintillator of claim 3, wherein the doping agent is selected from the group consisting of praseodymium ($Pr^{3+}$), neodymium ($Nd^{3+}$), and a blend of praseodymium and neodymium.

5. The scintillator of claim 4, wherein the tungstate-based material is doped in concentrations between about 0.01% and about 20% of praseodymium, neodymium, or a blend of praseodymium and neodymium.

6. The scintillator of claim 1, wherein the scintillator is a ceramic material.

7. The scintillator of claim 1, wherein the scintillator is a crystalline material.

8. The scintillator of claim 1, wherein the scintillator is a composite material.

9. The scintillator of claim 1, in combination with an imaging system.

10. The scintillator of claim 9, wherein the scintillator is part of an x-ray intensifying screen in the imaging system.

11. The scintillator of claim 1, wherein the tungstate-based material is selected from the group consisting of
    $Bi_2WO_6$,
    $LaWO_{0.6}N_{2.4}$,
    $Er_2WO_6$, and
    $Bi_{0.875}W_{0.125}O_{1.688}$.

12. The scintillator of claim 1, wherein the tungstate-based material is selected from the group consisting of
    $Ba_2Lu_{0.667}WO_6$,
    $CrWO_4$,
    $Na_{0.24}Gd_{0.59}Yb_{0.17}(WO_4)_{0.98}$,
    $Gd_{0.29}O_3Ta_{0.87}W_{0.13}$, and
    $AlWO_4$.

13. The scintillator of claim 1, wherein the tungstate-based material is selected from the group consisting of
    $Ba_{0.21}WO_3$,
    $LiGaW_2O_8$,
    $BaSr_5Lu_{1.6}Ho_{0.4}W_3O_{18}$,
    $GdKW_2O_8$, and
    $Ca_{4.26}W_{10}O_{30}$.

14. The scintillator of claim 1, wherein the tungstate-based material is selected from the group consisting of
    $La_3BWO_9$,
    $Ba_3W_2O_{6.27}N_{1.73}$,
    $Ba_2CaWO_6$,
    $Ca_2AsYW_2O_{12}$, and
    $Al_2W_3O_{12}$.

15. A radiation detector comprising:
    a scintillator comprising a tungstate-based material for use with an imaging device, wherein the tungstate based material is selected from the group consisting of
        $Gd_2WO_6$,
        $La_2W_2O_9$, and
        $CsTaWO_6$, and
    a photodetector optically coupled to the scintillator.

16. The radiation detector of claim 15, wherein the tungstate-based material is doped with a doping agent.

17. The radiation detector of claim 16, wherein the doping agent is selected from the group consisting of praseodymium ($Pr^{3+}$) and neodymium ($Nd^{3+}$).

18. The radiation detector of claim 15, wherein the scintillator is a ceramic material, a crystalline material, or a composite material.

19. A method for detecting radiation comprising the steps of:
    receiving radiation with a scintillator comprising a tungstate-based material for use with an imaging device, wherein the tungstate based material is selected from the group consisting of
        $Gd_2WO_6$,
        $La_2W_2O_9$, and
        $CsTaWO_6$, and detecting the light emitted from the scintillator with a photodetector.

20. The method of claim 19, wherein the tungstate-based material is doped with a doping agent.

21. The method of claim 20, wherein the doping agent is selected from the group consisting of praseodymium ($Pr^{3+}$) and neodymium ($Nd^{3+}$).

22. The method of claim 19, wherein the scintillator is a ceramic material, a crystalline material, or a composite material.

23. An imaging device comprising:
   at least one radiation source; and
   at least one radiation detector comprising:
      a scintillator comprising a tungstate-based material for use with an imaging device, wherein the tungstate based material is selected from the group consisting of
         $Gd_2WO_6$,
         $La_2W_2O_9$, and
         $CsTaWO_6$, and
      a photodetector optically coupled to the scintillator.

24. The imaging device of claim 23, wherein the imaging device is a CT, SPECT or PET imaging device.

25. A scintillator comprising a tungstate-based material for use with an imaging device, wherein the tungstate-based material includes an orthorhombic crystal system or a cubic crystal system, wherein the tungstate-based material is selected from the group consisting of
   $Bi_2WO_6$,
   $Gd_{0.29}O_3Ta_{0.87}W_{0.13}$,
   $CsTaWO_6$,
   $Ba_2CaWO_6$, and
   $Al_2W_3O_{12}$.

26. A scintillator comprising a tungstate-based material for use with an imaging device, wherein the tungstate-based material includes a tetragonal crystal system or a hexagonal crystal system, wherein the tungstate-based material is selected from the group consisting of
   $LaWO_{0.6}N_{2.4}$,
   $Bi_{0.875}W_{0.125}O_{1.688}$,
   $Na_{0.24}Gd_{0.59}Yb_{0.17}(WO_4)_{0.98}$,
   $Ba_{0.21}WO_3$,
   $Ca_{4.26}W_{10}O_{30}$,
   $La_3BWO_9$, and
   $Ca_2AsYW_2O_{12}$.

27. A scintillator comprising a tungstate-based material for use with an imaging device, wherein the tungstate-based material includes a trigonal crystal system, a rhombohedral crystal system, or a triclinic crystal system, wherein the tungstate-based material is selected from the group consisting of
   $Ba_2Lu_{0.667}WO_6$,
   $La_2W_2O_9$,
   $BaSr_5Lu_{1.6}HO_{0.4}W_3O_{18}$, and
   $Ba_3W_2O_{6.27}N_{1.73}$.

28. A scintillator comprising a tungstate-based material for use with an imaging device, wherein the tungstate-based material includes a monoclinic crystal system and is selected from the group consisting of
   $Er_2WO_6$,
   $Gd_2WO_6$,
   $CrWO_4$,
   $AlWO_4$,
   $LiGaW_2O_8$, and
   $GdKW_2O_8$.

* * * * *